United States Patent
Jabori et al.

(10) Patent No.: US 8,271,231 B2
(45) Date of Patent: Sep. 18, 2012

(54) COMPUTER DEVICE CONFIGURATION SYSTEM AND METHOD

(75) Inventors: Monji G. Jabori, Houston, TX (US); Qijun Chen, Spring, TX (US); Rahul V. Lakdawala, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1689 days.

(21) Appl. No.: 11/259,502

(22) Filed: Oct. 26, 2005

(65) Prior Publication Data

US 2007/0093979 A1 Apr. 26, 2007

(51) Int. Cl.
G06F 11/30 (2006.01)
H04B 17/00 (2006.01)
G08C 19/02 (2006.01)

(52) U.S. Cl. ...... 702/182; 73/865.8; 73/865.9; 370/252; 375/224; 702/57; 702/108

(58) Field of Classification Search .......... 375/224, 375/227; 398/25, 1, 9; 702/64, 108, 117, 702/182, 1, 57, 127, 187, 189; 73/432.1, 73/865.8, 865.9; 370/201, 241, 252; 713/1, 713/100
See application file for complete search history.

(56) References Cited

U.S. PATENT DOCUMENTS

| | | | | |
|---|---|---|---|---|
| 3,506,918 A * | 4/1970 | Perreault | ...... | 375/224 |
| 4,581,639 A * | 4/1986 | Judge | ...... | 348/192 |
| 4,583,233 A * | 4/1986 | Barrows | ...... | 375/228 |
| 6,546,343 B1 * | 4/2003 | Batra et al. | ...... | 702/64 |
| 6,590,432 B1 | 7/2003 | Wu et al. | | |
| 6,944,692 B2 * | 9/2005 | Smith et al. | ...... | 710/106 |
| 6,977,534 B2 * | 12/2005 | Radelinow | ...... | 327/112 |
| 6,988,044 B2 * | 1/2006 | Batra et al. | ...... | 702/64 |
| 7,054,771 B2 * | 5/2006 | Batra et al. | ...... | 702/64 |
| 7,154,944 B2 * | 12/2006 | Jungerman | ...... | 375/224 |
| 7,164,997 B2 * | 1/2007 | Batra et al. | ...... | 702/64 |
| 7,181,146 B1 * | 2/2007 | Yorks | ...... | 398/195 |
| 7,296,104 B2 * | 11/2007 | Smith et al. | ...... | 710/106 |
| 7,339,985 B2 * | 3/2008 | Rao | ...... | 375/226 |
| 7,583,976 B2 * | 9/2009 | Batra et al. | ...... | 455/522 |
| 7,929,489 B2 * | 4/2011 | Dang | ...... | 370/328 |
| 2002/0017929 A1 * | 2/2002 | Garrett et al. | ...... | 327/108 |
| 2002/0057659 A1 * | 5/2002 | Ozluturk et al. | ...... | 370/335 |
| 2003/0051086 A1 * | 3/2003 | Smith et al. | ...... | 710/106 |
| 2004/0034485 A1 * | 2/2004 | Batra et al. | ...... | 702/64 |
| 2004/0086034 A1 * | 5/2004 | Jungerman | ...... | 375/224 |
| 2004/0088469 A1 | 5/2004 | Levy | | |
| 2004/0103333 A1 | 5/2004 | Martwick et al. | | |
| 2004/0120352 A1 * | 6/2004 | Jungerman | ...... | 370/503 |

(Continued)

OTHER PUBLICATIONS

Tektronix: "InfiniBand Serial Data Compliance and Analysis Application PHP022310", Adapted for the RT-Eye Online Help, Version 1.0.0 (Aug. 2003); 26 pages, down loade Mar. 2, 2007.*

Primary Examiner — Edward Cosimano

(57) ABSTRACT

A configuration method for a computer device comprises generating a load condition on at least one serial bus link using a plurality of differential voltage levels, determining a minimum voltage differential value for producing an eye compliance diagram at a receiver of the at least one serial bus link, and configuring a driver associated with the at least one serial bus link to drive an operational differential voltage level on the at least one serial bus link within a predetermined range of the minimum voltage differential.

14 Claims, 2 Drawing Sheets

U.S. PATENT DOCUMENTS

| | | | |
|---|---|---|---|
| 2004/0124888 A1* | 7/2004 | Radelinow | 327/65 |
| 2004/0131113 A1* | 7/2004 | Rao | 375/226 |
| 2005/0146963 A1* | 7/2005 | Batra et al. | 365/207 |
| 2006/0009931 A1* | 1/2006 | Smith et al. | 702/58 |
| 2006/0015275 A1* | 1/2006 | Batra et al. | 702/64 |
| 2007/0099644 A1* | 5/2007 | Batra et al. | 455/522 |

* cited by examiner

COMPUTER DEVICE CONFIGURATION SYSTEM AND METHOD

BACKGROUND OF THE INVENTION

An increasing number of computer devices, such as portable laptop or notebook computers, handheld computing devices, desktop computers, etc., are utilizing a peripheral component interconnect (PCI) express high-speed serial input/output (I/O) bus to take advantage of high bandwidth and low latency. However, the PCI express architecture itself consumes power. Thus, the additional power consumption of the PCI express architecture can adversely affect battery life (e.g., for a portable computing device), cause an increased load on thermal energy dissipation systems and/or detract from the amount of power available for other systems and/or applications.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE DRAWINGS

The preferred embodiments of the present invention and the advantages thereof are best understood by referring to FIGS. 1-4 of the drawings, like numerals being used for like and corresponding parts of the various drawings.

Figure 1:
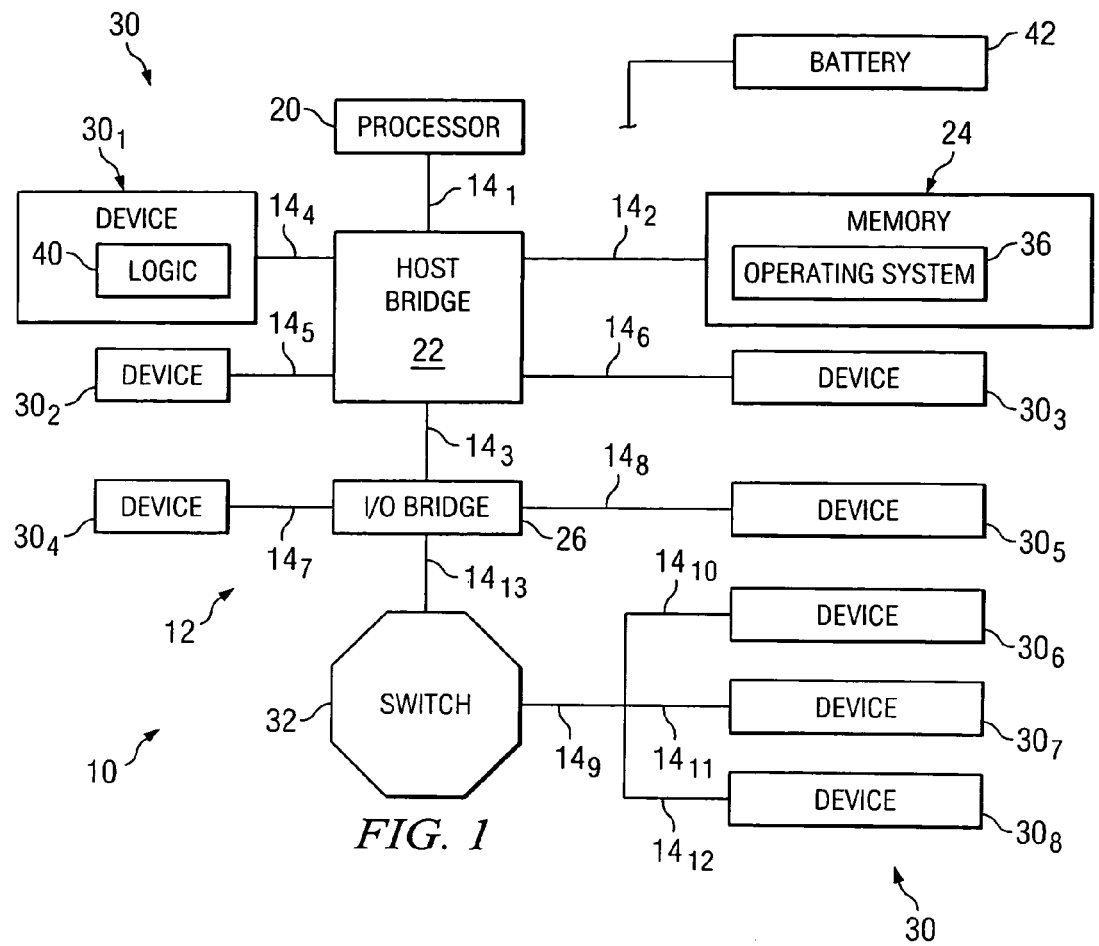
FIG. 1 is a diagram illustrating an embodiment of a computer device in which an embodiment of a configuration system and method in accordance with the present invention is employed to advantage.

FIG. 1 is a diagram illustrating an embodiment of a computer device configuration system 10 in accordance with the present invention. In the embodiment illustrated in FIG. 1, system 10 is implemented in a computer device 12 configured to utilize a peripheral component interconnect (PCI) express high-speed serial input/output (I/O) bus 14 architecture. In the embodiment illustrated in FIG. 1, computer device 12 comprises a processor 20 communicatively coupled to a host bridge 22 by PCI express bus $14_1$, a memory 24 communicatively coupled to host bridge 22 by PCI express bus $14_2$, and an input/output (I/O) bridge 26 communicatively coupled to host bridge 22 by PCI express bus $14_3$. In the embodiment illustrated in FIG. 1, devices 30 are communicatively coupled by PCI express buses 14 to host bridge 22 and/or I/O bridge 26, respectively. For example, in the illustrated embodiment, devices $30_1$, $30_2$, and $30_3$ are communicatively coupled to host bridge 22 by respective PCI express buses $14_4$, $14_5$ and $14_6$. Devices $30_4$ and $30_5$ are communicatively coupled to I/O bridge 26 by respective PCI buses $14_7$ and $14_8$. Further, devices $30_6$, $30_7$ and $30_8$ are communicatively coupled to a switch 32 by PCI express bus $14_9$ by respective PCI express bus branches $14_{10}$, $14_{11}$, and $14_{12}$, and switch 32 is communicatively coupled to I/O bridge 26 via PCI express bus $14_{13}$.

Devices 30 may comprise any type of device such as, but not limited to, a hard disk drive (HDD), a graphics module or subsystem, local input/output interface(s), an Ethernet interface, a docking station or any other type of peripheral and/or non-peripheral device or component. It should also be understood that the architecture and/or resource functions of system 10 may be otherwise configured (e.g., host bridge 22 may be formed as part of and/or otherwise incorporated into processor 20, memory 24 may be formed as part of and/or otherwise incorporated into processor 20, etc.). In FIG. 1, a battery 42 is coupled to computer device 12 for providing power to computer device 12. Battery 42 may comprise an internal battery, external battery or any other type of self-contained power source for delivering power to computer device 12. Computer device 12 may comprise any type of computing device such as, but limited to, a notebook or laptop computer, tablet computer, personal digital assistant, or gaming device.

In the embodiment illustrated in FIG. 1, device $30_1$, comprises logic 40 which may comprise software, hardware, or a combination of software and hardware. For ease of illustration, logic 40 is illustrated only with respect to device $30_1$. However, it should be understood that additional and/or all devices 30, memory 24, switch 32, I/O bridge 26 and/or host bridge 22 may be configured having logic 40 in accordance with the present invention. In operation, logic 40 is configured to drive a differential voltage level onto one or more links of a particular bus branch 14 to optimize usage and/or otherwise extend a life of battery 42 (i.e., a reduced differential voltage level resulting in reduced current draw from battery 42).

Figure 2:
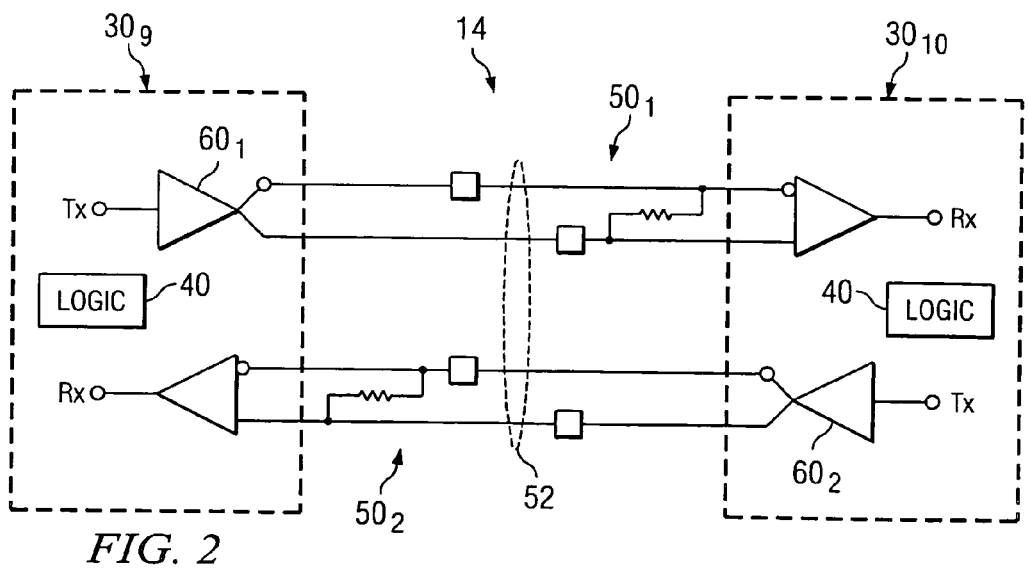
FIG. 2 is a diagram illustrating a device interconnect architecture of the computer device of FIG. 1.

FIG. 2 is a diagram illustrating an embodiment of a bus 14 extending between devices $30_9$ and $30_{10}$. In FIG. 2, bus 14 comprises two links $50_1$, and $50_2$ forming of a set of unidirectional differential signal pairs referred to herein as a lane 52. In the embodiment illustrated in FIG. 2, link $50_1$ comprises a transmitter $T_x$ in device $30_9$ and a receiver $R_x$ in device $30_{10}$, and link $50_2$ comprises a transmitter $T_x$ in device $30_{10}$ and a receiver $R_x$ in device $30_9$. Drivers $60_1$, and $60_2$ of respective transmitters $T_x$ of devices $30_9$ and $30_{10}$ are used to drive a differential voltage level onto respective links $50_1$ and $50_2$ for communicating a data package thereacross.

The differential voltage levels transmitted by drivers $60_1$ and $60_2$ are generally configured to compensate for differential voltage signal swing attenuation caused by parasitic, resistive, dielectric, skin effect, trace length, vias, connectors and/or other losses such that an identifiable signal is received by receivers $R_x$ of respective devices $30_9$ and $30_{10}$. Embodiments of the present invention are used to analyze the bus 14 architecture of computer device 12 at a variety of differential voltage levels and/or load conditions to determine a minimum differential voltage level that may be applied and/or driven on a particular bus 14 while maintaining signal compliance at the receiver $R_x$ of the particular bus 14. Based on the determined minimum differential voltage level that may be applied and/or driven on a particular bus 14, an operational differential voltage value is selected to be driven on the particular bus 14 during normal and/or non-test operation of the computer device 12. For example, the operational differential voltage value is preferably selected to be within a predetermined range of the minimum differential voltage level (e.g., a predetermined and/or selected tolerance range from the minimum signal-compliant differential voltage level) to accommodate unexpected signal losses and/or operating load conditions. Thus, in operation, drivers $60_1$, and $60_2$ are configured and/or otherwise controlled (e.g., by logic 40) to drive the selected operational differential voltage level during operation of computer device 12, thereby ensuring signal compliance and reducing current draw from battery 42 (FIG. 1). As a result of implementation of some embodiments, the operational differential voltage value may fall below minimum differential voltage swing values set forth in the PCI express open standards specification.

Figure 3:
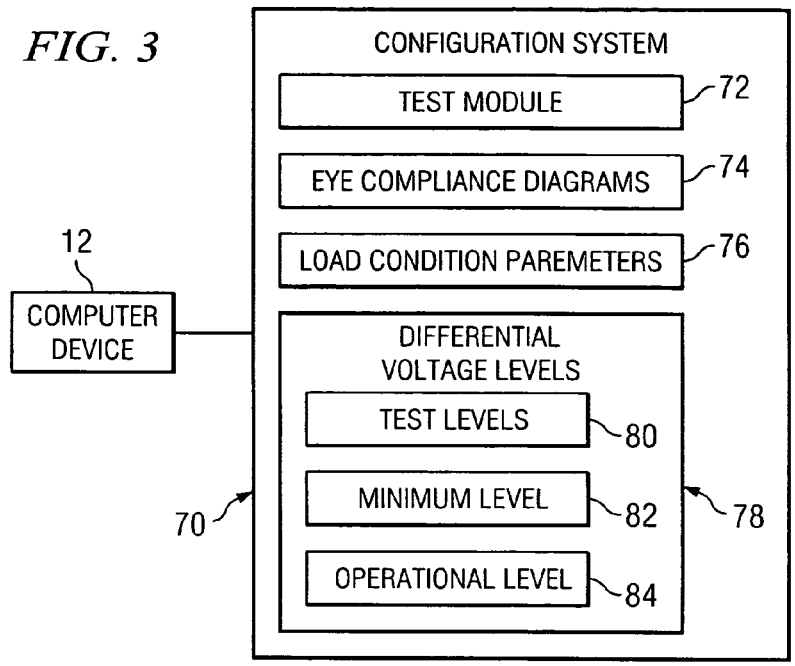
FIG. 3 is a diagram illustrating an embodiment of a configuration system used in connection with the computer device such as that of FIG. 1 in accordance with the present invention.

FIG. 3 is a diagram illustrating an embodiment of a configuration system 70 used in combination with computer device 12 to determine a power optimized configuration for computer device 12 in accordance with the present invention. In the embodiment illustrated in FIG. 3, configuration system 70 is configured to analyze particular bus 14 architectures of computer device 12 under varying differential voltage levels and/or load conditions to facilitate identification of the minimum differential voltage level that may be driven across a particular link $50_1$ or $50_2$ (referred to hereinafter separately and/or collectively as applicable, as link 50) of bus 14 while maintaining a compliant signal at the receiver RX (FIG. 2) of the particular link 50. For example, configuration system 70 is preferably communicatively couplable to one or more links 50 of computer device 12 (e.g., at receivers RX of links 50 and transmitters TX of such links 50) and/or communicatively couplable to one or more applications or other processing hardware/software of computer device 12 to facilitate applying varying load conditions to computer device 12 and/or links 50.

In the embodiment illustrated in FIG. 3, configuration system 70 comprises a test module 72 which may comprise hardware, software, or a combination of hardware and software. Test module 72 is used to generate one or more eye compliance diagrams 74 associated with a receiver $R_x$ (FIG. 2) of a particular link 50 for evaluating signal compliance at the receiver $R_x$.

In the embodiment illustrated in FIG. 3, configuration system 70 comprises load condition parameters 76 and differential voltage levels 78. Load condition parameters 76 comprise information associated with different operating and/or load conditions of computer device 12 associated with a particular link 50 (FIG. 2). For example, load condition parameters 76 may comprise information associated with different processing levels, operating temperature conditions, and/or other factors that may influence and/or otherwise affect signal compliance at a receiver $R_x$ of a particular link 50 for different differential voltage levels. In some embodiments of the present invention, configuration system 70 is configured to apply and/or otherwise cause the different load conditions to be applied to computer device 12. However, it should be understood that the different load condition parameters 76 may be otherwise applied to computer device 12 (e.g., independently of configuration system 70 by a user or otherwise).

Differential voltage levels 78 comprise information associated with different differential voltage levels associated with a particular link 50 (FIG. 2). For example, in the embodiment illustrated in FIG. 3, differential voltage levels 78 comprise differential voltage test levels 80, differential voltage minimum level 82 and differential voltage operational level 84. Differential voltage test levels 80 represent varying differential voltage levels applied to a particular link 50 (FIG. 2) under one or more load parameter(s) 76 of computer device 12. Differential voltage test levels 80 may be selected by pre-analysis of the link 150 architecture (e.g., link length, number of vias, connectors, etc.). Minimum differential voltage level 82 represents a minimum applied differential voltage level that produces a compliant signal at a receiver RX of the particular link 50 (FIG. 2). Operational differential voltage level 84 represents a differential voltage level to be used during normal and/or non-test operation of computer device 12 for the particular link 50 (FIG. 2). For example, operational differential voltage level 84 is preferably selected to be within a predetermined tolerance and/or range of minimum differential voltage level 82 to reduce a current drawn from battery 42 (FIG. 1) while providing a desired safety level to compensate for unforeseen load and/or signal loss conditions.

In operation, configuration system 70 applies and/or otherwise causes a particular transmitter TX (e.g., via drivers $60_1$ or $60_2$ (referred to hereinafter, separately or collectively as applicable, as driver 60)) to drive different differential voltage test levels 80 onto a particular link 50 (FIG. 2) at selected load parameter 76 conditions. Test module 72 generates and/or otherwise causes eye compliance diagrams 74 to be created for each of the different differential voltage test levels 80 driven onto link 50 (FIG. 2). Based on the eye compliance diagrams 74, a minimum differential voltage level 82 is identified that produces signal compliance at a receiver RX for the particular link 50 (FIG. 2) for the tested load parameter 76 condition(s). Based on the minimum differential voltage level 82 identified for maintaining signal compliance at the receiver RX, an operational differential voltage level 84 is selected. The transmitter TX (e.g. driver 60 (FIG. 2)) for the particular link 50 is programmed and/or otherwise re-configured to drive the determined operational differential voltage level 84 during normal and/or non-test operations of computer device 12, thereby producing a relatively low differential voltage level to be driven across the particular link 50 and minimizing current draw from battery 42 (FIG. 1).

Figure 4:
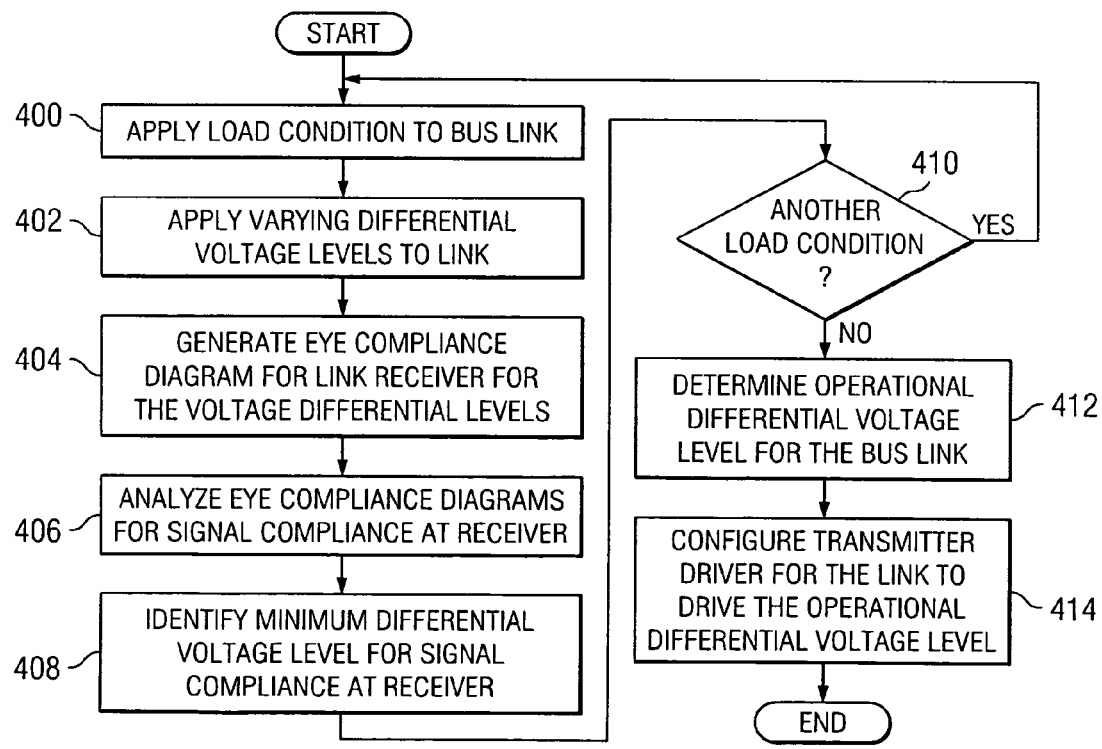
FIG. 4 is a flow diagram illustrating an embodiment of a computer device configuration method in accordance with the present invention.

FIG. 4 is a flow diagram illustrating an embodiment of a power optimization configuration method for computer device 12 in accordance with the present invention. The method begins at block 400, where a particular load parameter 76 condition is applied to a particular bus 14 link 50. At block 402, varying differential voltage test levels 80 are applied to the particular link 50 for the selected load parameter 76 condition. At block 404, test module 72 generates eye compliance diagrams 74 for the receiver $R_x$ of the particular link 50 for the applied differential voltage test levels 80. At block 406, the eye compliance diagrams 74 are analyzed for signal compliance at the particular receiver $R_x$.

At block 408, the eye compliance diagrams 74 are compared and/or otherwise evaluated for the applied differential voltage test levels 80, and minimum differential voltage level 82 is identified based on the analyzed eye compliance diagrams 74 for producing signal compliance at the receiver $R_x$ of the particular link 50. At decisional block 410, a determination is made whether another load parameter 76 condition is to be applied to the particular link 50. If another load parameter 76 condition is to be applied, the method returns to block 400. If another load parameter 76 condition is not applied, the method proceeds to block 412, where an operational differential voltage level 84 is selected based on the minimum differential voltage level 82 identified at block 408. At block 414, logic 40 and/or the transmitter $T_x$ driver 60 for the particular link 50 is configured to drive the operational differential voltage level 84 for the particular link 50 during normal and/or non-test operations of the computer device 12.

Thus, embodiments of the present invention provide a power-optimized configuration for computer device 12 by analyzing particular bus 14 link 50 loss characteristics and configuring a transmitter $T_x$ driver 60 of the particular link 50 to drive a relatively low differential voltage level (e.g., the operational differential voltage level 84) on the particular bus 14 link 50 during operation of the computer device 12, thereby minimizing current draw from battery 42 (FIG. 1) and providing for optimized use of battery 42 capacity (e.g., extending and/or increasing battery 42 life).

What is claimed is:

1. A method for configuring a computer device, comprising:
   generating a load condition on at least one serial bus link using a plurality of differential voltage levels;
   determining a minimum voltage differential value for producing an eye compliance diagram at a receiver of the at least one serial bus link; and
   configuring a driver associated with the at least one serial bus link to drive an operational differential voltage level on the at least one serial bus link within a predetermined range of the minimum voltage differential value.

2. The method of claim 1, further comprising generating a plurality of different load conditions on the at least one serial bus link.

3. The method of claim 1, further comprising evaluating an eye compliance diagram corresponding to each of the differential voltage levels.

4. The method of claim 1, further comprising evaluating an eye compliance diagram corresponding to each of a plurality of different load conditions on the at least one serial bus link at the plurality of differential voltage levels.

5. The method of claim 1, further comprising driving the plurality of differential voltage levels via a transmitter of the at least one serial bus link.

6. The system of claim 1, wherein configuring a driver comprises configuring a driver of a transmitter associated with the at least one serial bus link to drive the operational differential voltage level.

7. A computer device formed by a configuration method comprising:
   generating a load condition on at least one serial bus link under a plurality of differential voltage levels;
   determining a minimum voltage differential value for producing an eye compliance diagram at a receiver of the at least one serial bus link; and
   configuring a driver associated with the at least one serial bus link to drive an operational differential voltage level on the at least one serial bus link within a predetermined range of the minimum voltage differential value.

8. The computer device of claim 7, wherein the method further comprises generating a plurality of different load conditions on the at least one serial bus link.

9. The computer device of claim 7, wherein the method further comprises evaluating an eye compliance diagram corresponding to each of the differential voltage levels.

10. The computer device of claim 7, wherein the method further comprises driving the plurality of differential voltage levels via a transmitter of the at least one serial bus link.

11. The computer device of claim 7, wherein the method further comprises configuring a driver of a transmitter associated with the at least one serial bus link to drive the operational differential voltage level.

12. A computer device, comprising:
    at least one serial bus link extending between at least two devices; and
    a driver configured to drive an operational differential voltage level onto the at least one serial bus link, the operational differential voltage level selected to be within a predetermined range of a minimum voltage differential level that produces an eye compliance diagram at a receiver of the at least one serial bus link in response to a load condition applied to the at least one serial bus link at a plurality of differential voltage levels.

13. The computer device of claim 12, further comprising a transmitter associated with the at least one serial bus link for driving the operational differential voltage level onto the at least one serial bus link.

14. The computer device of claim 12, wherein the minimum voltage differential value is based on a plurality of different load conditions applied to the at least one serial bus link.

* * * * *